July 8, 1941.  C. A. CULVER  2,248,661
ALTERNATOR
Filed Sept. 27, 1938  2 Sheets-Sheet 2
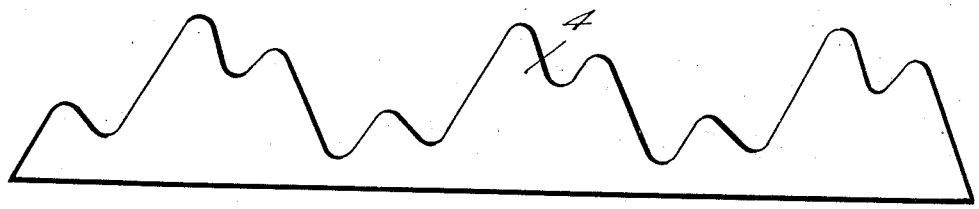
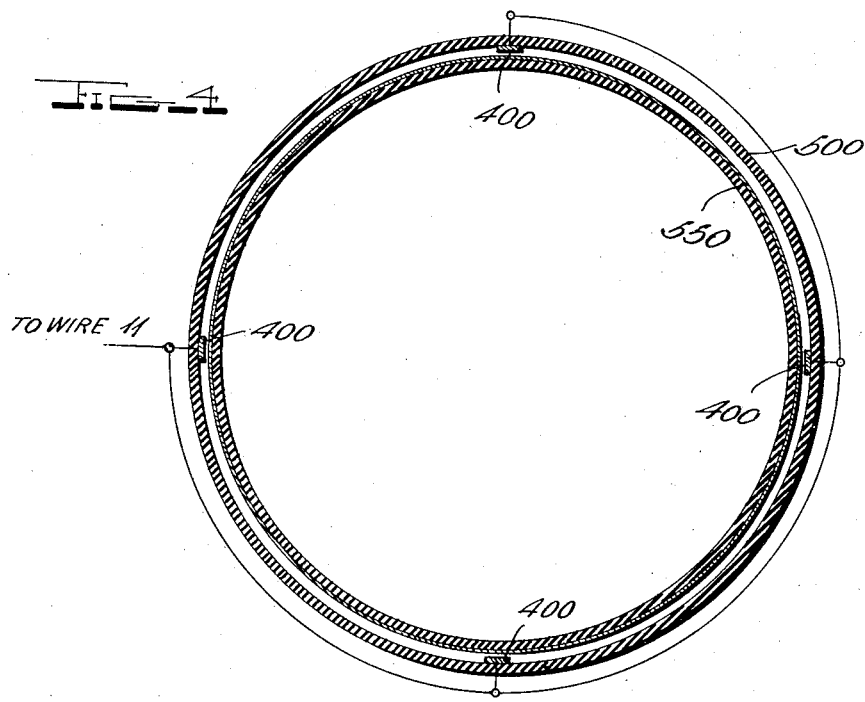
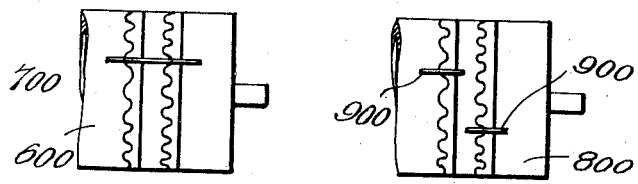
INVENTOR.
Charles A. Culver,
BY
ATTORNEY Patented July 8, 1941

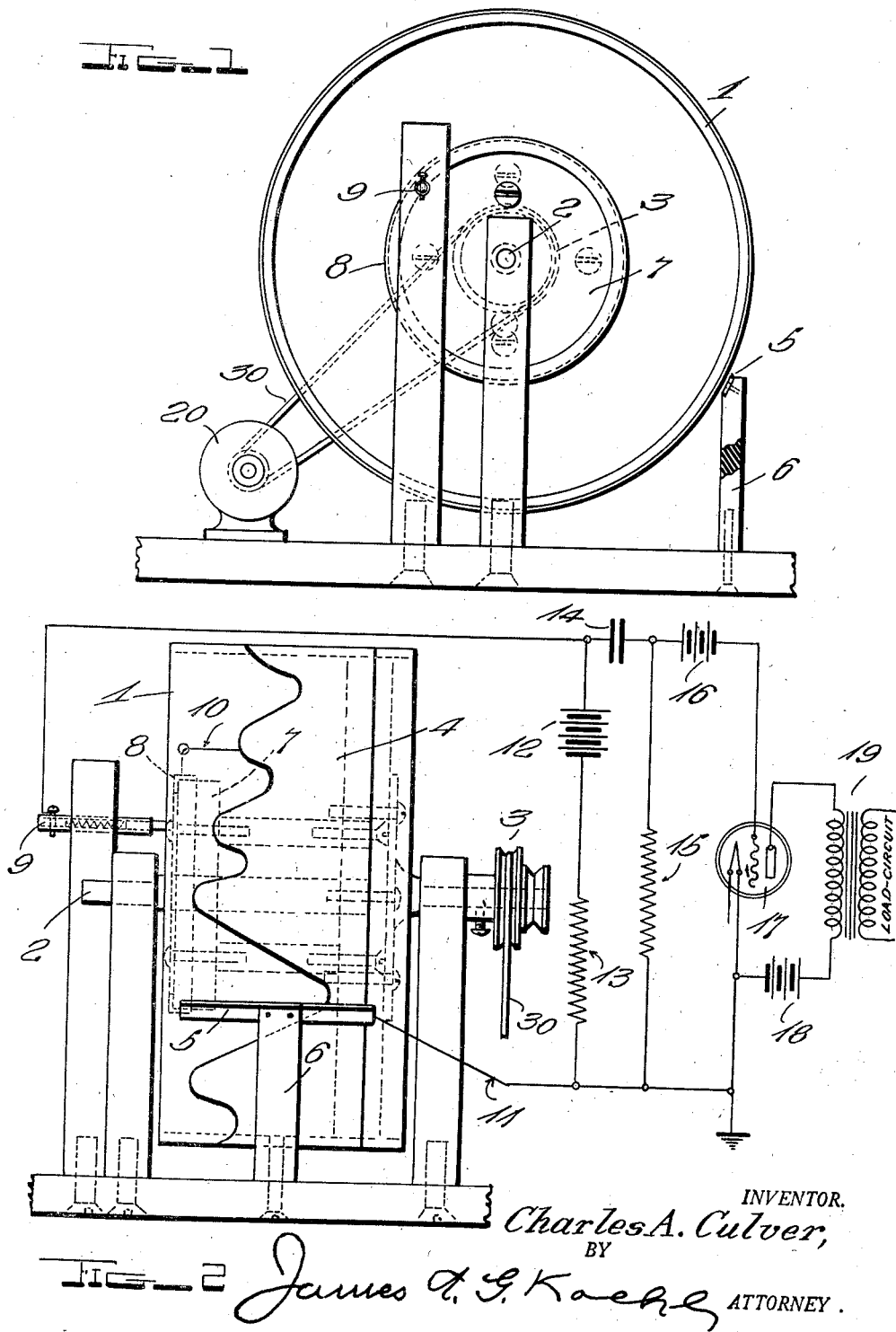

2,248,661

UNITED STATES PATENT OFFICE 2,248,661

ALTERNATOR

Charles A. Culver, Northfield, Minn., assignor, by mesne assignments, to Hammond Instrument Company, Chicago, Ill., a corporation of Delaware Application September 27, 1938, Serial No. 231,971

6 Claims. (Cl. 175—363)

This invention relates to alternators.

The invention is particularly directed to the varying capacity reactance-type of alternator disclosed and broadly claimed in my original Patent No. 1,893,019, dated January 3, 1933, reissued June 22, 1937, under No. 20,416.

The varying capacity reactance disclosed in my aforestated prior patent is characterized by condenser electrodes of relative shapes and forms adapted during relative motion thereof to produce a variable current of a desired wave shape. A varying capacity reactance of this nature when connected in the input circuit of a space discharge tube, as the patent teaches, produces in the output circuit of said space discharge tube a variable current, the wave form of which is predetermined by the relative forms and shapes of said electrodes.

An analytical investigation of the theory of an electrostatic alternator characterized as aforestated discloses the fact that the magnitude of the developed alternating E. M. F. is inversely proportional to the magnitude of the inherent capacitance of the opposing electrodes. I have discovered that by making the width of the active surface of a scanning electrode a small fraction of the distance between any point of maximum width of the scanned capacity area of a coacting electrode and the next adjacent point of minimum width of said scanned area, this inherent capacitance is kept to a small minimum, such that maximum E. M. F. is developed. In terms of wavelength, it is found that the effective width of the scanning electrode should be less than half a wavelength.

It therefore is an important object of the invention to provide a simple and accurately functioning alternator which insures maintenance of small inherent capacitance of the opposing electrodes and development of maximum E. M. F.

A further object is to provide electrodes of precalculated shapes, forms and relative proportions, mounted and adapted accurately to govern the effective capacitance of the alternator and insure electrical reproduction of high fidelity.

Another object is to provide means whereby any number of predetermined waveform patterns can be simultaneously utilized for the production of alternating voltages of different tone frequencies, each of any predetermined waveform. That is to say, the patterns may each be of a different complex waveform, or they may each be of sinusoidal waveform conforming to the vibrational frequency of a predetermined musical tone.

Broadly speaking, the invention proposes improved means for producing alternating current of small magnitude in the input circuit of a space discharge tube, the waveform of which is a true replica of the waveform determined by a definite contour of a scanned capacity area.

While I do not propose to limit myself to the particular structural features herein disclosed, an important feature of my invention resides in the novel construction of an electrode, the effective capacity area of which is a layer or sheet of electrically conducting material adapted in coaction with a rectilinear electrode of proper proportions to originate variable current of a predetermined waveform which will be commercially useful for a large variety of purposes.

A further important object of the invention is to provide means by which the instantaneous capacitance of a scanned area is increased in a manner greatly to augment the energy developed by the alternator.

A further object is to provide an electrostatic alternator, a part of which is a common support of non-conducting material for any desired number of waveform patterns of electrically conducting material, which patterns can be stenciled upon the support or otherwise applied thereto, such, for instance, by affixing thereto pre-cut sheets of foil or the like. In either case, the patterns will consist of independent circles of conjoined capacity areas of predetermined configuration, all of which can be capacitatively related to a common scanning electrode, or instead, each circle can be associated with a separate scanning electrode as the particular case may require or be found desirable.

A still further object is to provide an electrode assembly or organization, the electrodes of which are spaced from each other a distance equal to one wave length of an associated waveform pattern, the arrangement serving to increase the instantaneous capacitance and proportionately to augment the energy output of the alternator.

The manner in which these principles can be utilized will more fully appear from the following detailed description with reference to the accompanying drawings, in which:

Figure 1 is an end elevation of the alternator;

Figure 2 is a view in side elevation of the alternator connected in the electrical network employed in the system of my invention;

Figure 3 is plan view of a section of a continuous electrode showing a typical recurrent wave as illustrated in Figure 2;

Figure 4 is a transverse section through a modified form of alternator;

Figure 5 is a diagrammatic illustration of a plurality of wave form patterns mounted upon a common member and arranged in coaction with a scanner which is common to all of said patterns, and Figure 6 is a view similar to Figure 5 showing a form of the invention wherein each wave form pattern is adapted to be scanned by an electrode which is individual to an associated pattern.

Referring to the form of my invention shown in Figures 1 to 3, inclusive, a hollow cylinder 1 is provided, the same having an insulating outer surface or periphery, said drum being fixedly mounted on a shaft 2 upon which is secured a pulley 3 or other well known form of driven element from which power can be received from a driving source or transmission mechanism for imparting continuous rotational motion to said drum. As the invention may be put to a large variety of uses, no particular form of power transmission is deemed necessary to be shown herein. In one use of the invention it may simply be required to drive the drum at an assigned constant speed, in which event, a transmission employing the constant speed motor shown in my prior patent will be entirely satisfactory. In another use to which the invention can be put, a plurality of drums may be employed for the production of alternating voltages of different tone frequency. For the use last stated, any well known power transmission can be employed to drive the respective drums at different relative speeds for a predetermined pitch relation of the produced frequencies.

The shaft 2 rotates in bearings which are supported in any convenient manner upon a mounting. A slip-ring 8 is mounted on said shaft by means of an insulating bushing 7. A suitable contacting brush 9 bears yieldingly against said slip-ring for the purpose of making electrical contact therewith. The outer surface of the drum 1 is provided with a wave form pattern consisting of a layer of electrically conducting material, such, for example, as metal foil or carbon cemented or otherwise firmly and evenly affixed to said drum. One edge of this electrically conducting layer is straight while the other edge is undulatory or given a particular wavy contour, as hereinafter indicated.

Parallel to the axis of shaft 2 and immediately adjacent to the periphery of the drum 1, say at a distance of the order of a millimeter, there is supported a narrow edged conducting strip 5 whose length is greater than the maximum width of the area 4, and whose width is but a small fraction of the distance between any point of maximum width of said area and the next adjacent point of minimum width of said area. In terms of wavelength, the approximate width of the strip 5 is less than half a wavelength. Said conducting strip is supported by an insulating member 6.

Associated with the parts above described is an electrical system in which leads 10 and 11 electrically connect brush 9 and the scanning electrode 5, respectively with a source of polarizing potential 12 and a series resistor 13 and with an amplifying system including a space discharge tube 17, and components 16, and 18—19, inclusive, as shown. Resistor 13 has a value of the order of two megohms; and the polarizing potential may be of the order of several hundred volts. Elements 12 and 13 are in turn connected to an amplifier network through the coupling condenser 14, as shown.

Having described the essential structural features of the device, the operation thereof is as follows:

The wave form pattern or wave area 4 and the fixed insulated conductor or scanning electrode 5, will be charged to the potential difference existing between the terminals of the polarizing source 12. That portion of the wave form pattern or wave area 4 which, at any given instant, is directly opposite the fixed scanning electrode 5 will constitute an electrostatic condenser. If and when the pattern is caused to move relative to the fixed scanning electrode by mechanically connecting the pulley 3 with a synchronous motor or other well known driving unit, the capacitance of the electrostatic system will vary, and thus the charging current from the potential source 12 will be caused to vary in a corresponding manner. If and when the parallelism of the axis of the wave form pattern and the scanning electrode remain fixed, the magnitude of the aforestated charging current will always bear a fixed relation to the instantaneous value of the capacitance. It therefore follows that the charging current passing through the resistor 13 will vary as the capacitance varies; and the variation of the capacitance, for a fixed peripheral speed, will depend upon the contour of the wave form pattern. Thus there is established in the resistor 13 an alternating current of small magnitude, which, in wave form, is a replica of the wave form determined by the contour of said pattern.

The alternating current flowing in the resistor 13, as above set forth, will give rise to an alternating E. M. F. at the terminals of said resistor 13. This alternating E. M. F. will, from the nature of the case, be a replica as to wave form of the alternating current which gives rise to it. The alternating E. M. F. is impressed upon the amplifier network through the medium of the capacitance 14, and is amplified in said organization to any desired degree. Thus there is established in the load circuit of the amplifying system an electrical replica of the variations in capacitance caused by the relative motion between the aforestated wave form pattern and its coacting scanning electrode. The combination as recited herein is thus a means whereby any desired variation in capacitance can be translated into a corresponding variation in electrical energy.

The frequency and wave form of the alternating electrical output is determined by the number of complete wave forms which extend around the drum 1 and by the angular speed of said drum. A whole number of complete wave forms is always arranged on the periphery of a given drum. This will be clearly understood upon reference to Figure 3 wherein a typical recurrent wave area is shown, such as will be used in the form of my invention shown in Figures 1 and 2.

In the form of my invention shown in Figure 4 of the drawings, means are disclosed for increasing the instantaneous capacitance of the wave form pattern to thereby augment the energy output of the generator. This is accomplished by providing a plurality of scanning electrodes 400 on the inside of a drum 500 of insulating material, the said drum being coaxial with an inner drum 550 on which the wave pattern is mounted or formed. In practice, the scanning electrodes will be electrically connected in parallel, and each thereof will be spaced a distance apart equal to one wave length, or 360 electrical degrees.

In Figure 5 of the drawings is diagrammatically illustrated a drum 600 which constitutes a rotary member common to a plurality of wave form patterns, each of undulatory form for the production of a sinusoidal wave form. The patterns are disposed in side by side relation to each other and there is used in coaction therewith a single narrow edged scanning electrode 700. If all of these wave patterns are polarized, variable currents representing a complex wave form may be impressed upon the input circuit of the aforestated space discharge tube. It is understood, of course, that each of the aforestated wave patterns will conform to the vibrational frequency of a predetermined musical tone. If particular ones only of these patterns are polarized, it follows that the wave form in the output circuit of said space discharge tube will be changed accordingly and will be a composite of those patterns that are drawn upon.

In the form shown in Figure 6, the drum 800 is the same in every respect to the drum shown in Figure 5. The only difference between these two forms of the invention is that in Figure 6, each wave form pattern is individual to a coacting electrode 900. As many alternating voltages of predetermined frequencies can be impressed upon the input circuit of the space discharge tube as may be desired according as particular ones of said wave form patterns are charged from the source of potential and are placed in closed circuit with my net work. This can be accomplished in any well known manner by keying switches or other similar mechanism, not shown.

Having referred to means for continuously driving the drum 1 to enable its capacity area to be scanned by the electrode 5, I show a motor 20, belted at 30 to said pulley 3. However, and as previously set forth herein, the showing thus made shall be considered to be but one of several possible well known forms of power transmitting mechanism for said drum.

The term "area" employed in the claims shall mean the capacity surface of the drum or any particular part thereof axially of the drum, such for instance the part that is effective instantaneously during scanning motion of the electrode 5. Specifically, as regards any individual part of the entire area, I stress the fact that the length of the electrode is longer than said individual part so that any electrostatic fringing effect will be confined to points entirely outside the limits of said parts, which, in the illustration shown herein will be at the extreme ends of said electrode. In this manner distortion of the electrostatically developed voltage is prevented.

What I claim as my invention is:

1. A variable capacity reactance comprising capacitatively related parts, one of which is an electrode providing a predetermined wave form pattern having a straight edge at one side and the other a concentric series of electrodes in scanning relation to said pattern, said scanning electrodes being spaced apart from each other a distance equal to one wavelength of the wave form described by said pattern.

2. A variable capacity reactance comprising coaxial and capacitatively related parts, one of which is an electrode providing an endless waveform pattern, and the other a concentric series of electrodes in scanning relation to said pattern, said scanning electrodes being spaced apart from each other a distance equal to one wavelength of the wave form described by said pattern.

3. A variable capacity reactance device comprising a rotary cylindrical member of non-conductive material, a continuous undulatory waveform pattern of conductive material disposed circumferentially of and secured to said member, and fixed electrodes spaced apart from each other a distance equal to one wavelength of the waveform described by said pattern and disposed axially of said member and capacitatively related to said pattern.

4. A variable capacity reactance device for the continuous electrostatic production of a predetermined waveform of electrical impulses, said device comprising a pair of concentrically related members of non-conductive material mounted so that one thereof is free for continuous rotation in the other, means providing a predetermined capacity area upon the circumference of one of said members, and an electrode on the other member and capacitatively related to said area.

5. A variable capacity reactance comprising relatively rotatable, concentrically related annuli in which one annulus is nested in and has an external diameter which is less than the internal diameter of the other annulus so as to provide an air dielectric between said annuli, said annuli respectively having surfaces of conductive material separated from each other by said dielectric and of predetermined forms and shapes so that when the reactance is polarized and the annuli are in related motion as aforestated the capacitance of said reactance varies in accordance with a predetermined waveform.

6. A variable capacity reactance comprising a pair of relatively rotatable, concentrically related annuli of non-conductive material, one annulus nested in the other annulus of said pair of annuli and having an external diameter which is less than the internal diameter thereof so as to provide an air dielectric between said annuli, a capacity area in the form of an endless band of predetermined configuration encircling the peripheral surface of the first named annulus, and a series of equi-distantly related capacity areas upon the internal surface of the second named annulus and disposed parallel to each other and extending axially of said first named annulus, the encircling area being separated from said equi-distantly related capacity areas by the aforementioned dielectric.

CHARLES A. CULVER.